March 26, 1957 E. H. LEBEIS, JR 2,786,722
DISENGAGING SOLIDS FROM LIFT GAS
Filed June 12, 1951 2 Sheets-Sheet 1
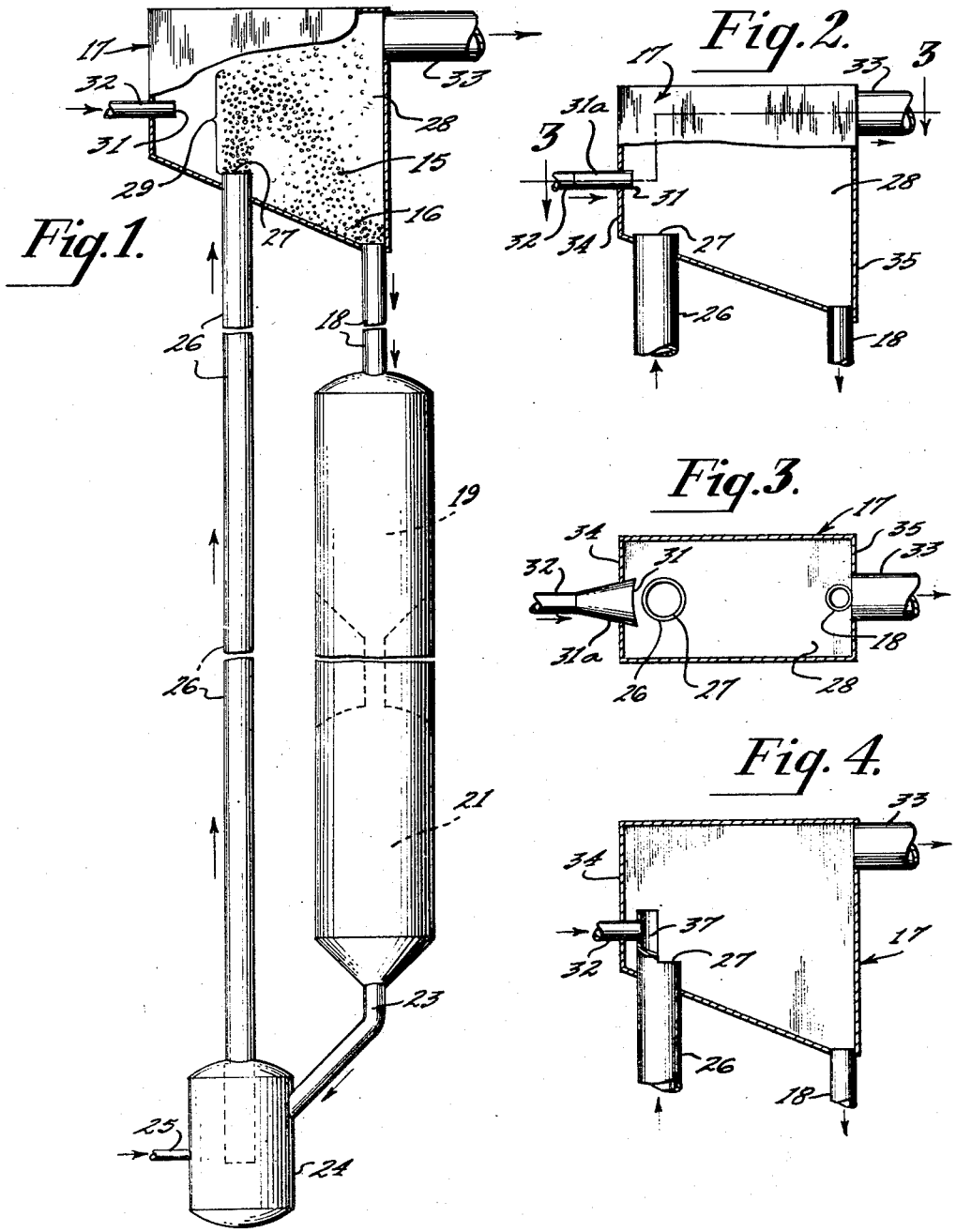
INVENTOR
Edward H. Lebeis, Jr.
BY
ATTORNEY

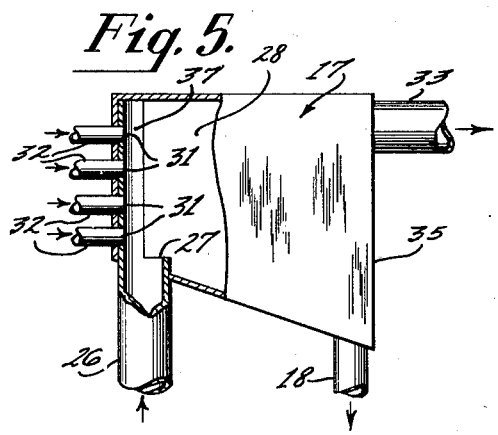
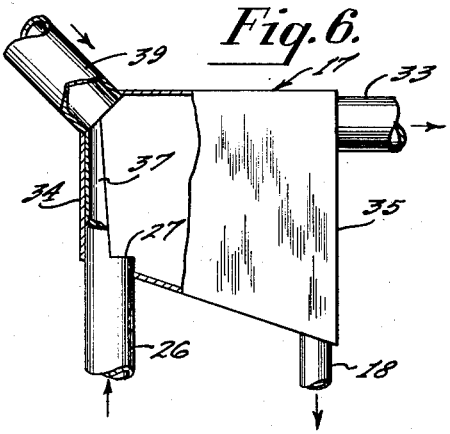
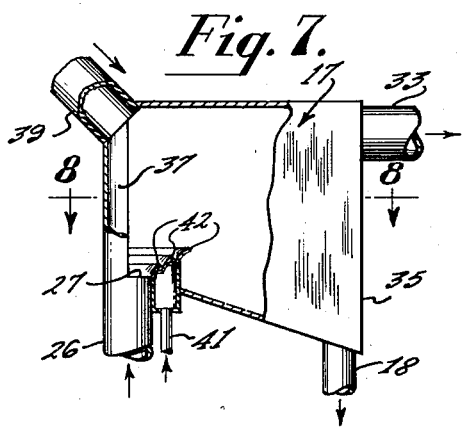
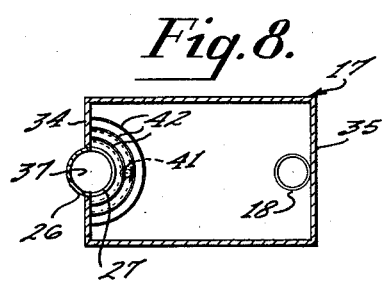
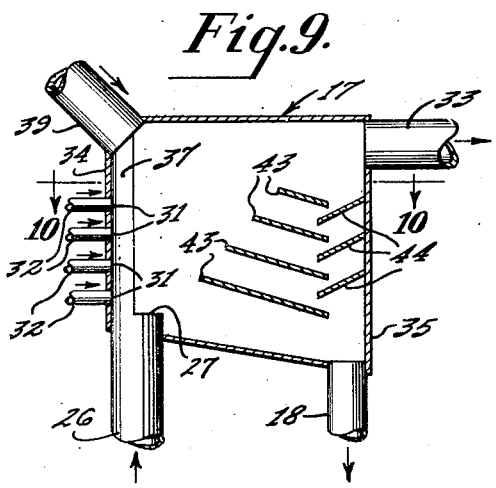
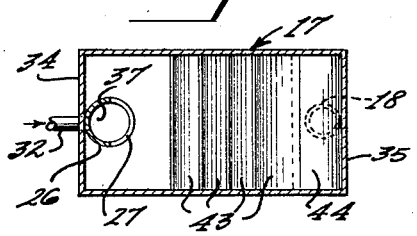
INVENTOR
Edward H. Lebeis, Jr.
ATTORNEY United States Patent Office 2,786,722
Patented Mar. 26, 1957

2,786,722

DISENGAGING SOLIDS FROM LIFT GAS

Edward H. Lebeis, Jr., Media, Pa., assignor to Houdry Process Corporation, Wilmington, Del., a corporation of Delaware Application June 12, 1951, Serial No. 231,115

4 Claims. (Cl. 302—62)

This invention involves a method of separating or disengaging granular solids from a fluid stream in which they have been conveyed, for example, from the mixture of solids and fluid flowing through, but after emerging from, a pneumatic lift engaged in elevating solid materials by a fluid stream flowing at a velocity high enough to support and carry along free-flowing solid materials. The method of the invention is particularly effective in lowering solids attrition by reducing opportunity for impact injury between the separated solid granules.

In general, the method of the invention in its possible embodiments can be carried out with various solid materials in the form of discrete particles as well as granules so long as they are free-flowing, and with various types of pneumatic conveying or lifting operations. However, since it occurs that the method of the invention is especially beneficial in systems in which granules or pellets such as those of solid catalytic materials are re-circulated, for example, through a relatively closed cycle, first say through a reaction zone and then to, and through, a regeneration zone and then to a pneumatic lift terminating in a disengager from which the separated solid catalyst again is fed to the reactor zone, the invention can be conveniently described in relation to its employment in such a system. It is to be understood, of course, that the application of the method of the invention is not restricted to that use of it.

Figures 1 and 2 in the article "New Houdriflow installations employ modified design," pages 170–175 of the September 1950 issue (volume 29, No. 9) of "Petroleum Refiner" include such a closed cycle, and show a catalytic petroleum-cracking system with a reactor above a regenerator from which the regenerated catalyst passes to a lower lift hopper and by gas lift is raised to the upper lift hopper to be fed again to the reactor. It is not unusual for the pellets or beads of catalyst to be raised a distance in the range of two hundred feet by the gas lift from the lower hopper to the upper hopper or disengager, and commonly a distance of at least one hundred and fifty feet, and most generally higher. The quantity of catalyst circulated ordinarily does not run under about one hundred tons per hour and in present practice it is not unusual for the catalyst circulation rate to be as high as two hundred and fifty or three hundred tons per hour, and sometimes higher, as seen from the article here referred to.

Such quantities of a catalyst carried in concentrations averaging about one to two pounds and at times more per cubic foot in lift pipes of practical diameter may attain an average velocity at the discharge or exit end of the lift of at least thirty and usually about forty feet per second or higher, unless suitable means are provided for further decelerating the catalyst. With such catalyst velocities as these at which the catalyst leaves the exit end of the lift and enters the disengager chamber, the emerging spray or fountain of catalyst pellets will be forcibly impelled against the top of the chamber with continuous eroding effect on it and concomitant considerable attrition even to a not too frangible type of pellet unless the disengager chamber ceiling is high enough above the outlet of the lift pipe to be at least just out of reach of the discharging stream of catalyst.

To provide adequate distance for the momentum imparted to the catalyst pellets to be dissipated sufficiently to avoid impact between the catalyst and the disengager ceiling, the disengager would have to be built inordinately tall, for example, from about fifteen to about twenty-five, and often as much as thirty, feet above the exit end of the lift. By thus so much further extending the height of the system not only is the problem of stability and safety greatly enlarged, but also there is met markedly increased cost not alone for the additional metals but also for their higher strengths and essential provisions for overcoming the added bending moment or torque on the so tall and comparatively slender structure.

Moreover, in addition to these disadvantages, even though erosion on the disengager shell and the attrition of the catalyst by impact contact with it are considerably reduced or substantially eliminated by the extended height of the disengager, there is nevertheless aggravated the problem involving attrition of the catalyst granules or pellets by greater impact with one another through contact of falling particles with the rising stream and by their increased fall from the greater height they reach, before taking a downward path to the surface of the reserve or surge bed of catalyst on the bottom of the disengager.

These and other disadvantages in the separating or disengaging of solids, especially granular solids, from the solids-fluid mixture emerging from a pneumatic lift are significantly overcome by the method of the invention. Considered generally, the invention involves a method of disengaging free-running, discrete particles of solid materials, and especially granular solids, from a fluid stream in which they are being carried, as from the mixture of solids and fluid emerging from the exit end of a pneumatic lift into a disengaging zone where the transported solids are to be separated from the conveying or lifting fluid, with significantly reduced attrition of the granular solids from impact with the enclosing surfaces and with one another and reduced erosion to the surfaces enclosing the disengaging zone otherwise exposed to impact from the stream of solids-fluid mixture discharging into that zone. The method comprises applying to the solids carried in the stream of solids-fluid mixture discharging from the exit end of the lift (at an elevation between the exit end and a level significantly below the highest point to which the solids would be carried, if undisturbed, before the momentum imparted to the solids on being discharged by the lift is overcome by the pull of gravity) a force produced by at least one other fluid stream and having a vector effective against the solids in a direction transverse to the direction of the stream emerging from the lift and of a magnitude to impel the solids out of their direction of discharge from the lift and thereby diverting them at a significantly lower height from the substantially solely upward direction in which they otherwise would have continued to be carried if this independent diverting force had not been applied to them.

The advantages and features of the method of the invention and the steps in its operation can be more readily understood when described with reference to the accompanying drawings, wherein: Figure 1 is a generalized representation in elevation, of a catalytic hydrocarbon conversion (e. g. cracking) system, including a pneumatic lift feeding into a disengager (with part of several of its walls broken away) designed to enable the operation of a specific embodiment of the invention as part of a continuous cycle involving the circulation of catalyst granules or pellets; Figure 2 is a similar elevation of a modification of the disengager of Figure 1; Figure 3 is a horizontal section along the line 3—3 of Figure 2; Figures 4, 5, 6, 7 and 9 represent respectively, in elevation similar to that in Figure 1, five further different modifications of the disengager of Figure 1; Figure 8 is a horizontal section along the line 8—8 of Figure 7; and Figure 10 is a similar section along the line 10—10 of Figure 9.

In the system represented in Figure 1, pelleted or spherical bead catalyst 15 flows downwardly from the catalyst surge bed 16 at the bottom of the lift disengaging hopper (or disengaging chamber, or merely disengager) 17 by gravity through the reactor seal leg 18 into the reactor 19 and through it as a downwardly moving, compact, non-turbulent bed, through the reactor-and-kiln-connecting seal leg 20 into the regenerator kiln 21 and subsequently through the kiln outlet seal leg 23 into the lift engaging hopper 24. Lift gas entering the hopper 24 through the lift gas feed line 25 impels the catalyst from the bed of it in the hopper into the lift pipe 26 through which the catalyst is elevated as a mixture of solid pellets in lift gas (or solids-fluid mixture or solids-gas mixture) to the discharge or exit end 27 of the lift pipe 26 into the disengaging zone 28 of the disengager 17, for the solid catalyst 15 to be disengaged or separated from the lift gas and to fall downwardly to join accumulated earlier separated catalyst in the catalyst surge bed 16 in the lowermost portion of the disengaging hopper 17 which includes such changes in design for the introduction of features essential to the carrying out of the method of the invention. The return of the disengaged catalyst to the catalyst surge bed 16 in the bottom of the hopper 17 completes one cycle in the re-circulation in the catalytic hydrocarbon conversion system. Additional details of such a cycle in such a conversion can be developed from the article referred to above in "Petroleum Refiner" and in an article entitled "Houdriflow: new design in catalytic cracking" in the January 13, 1949 "Oil and Gas Journal" at page 78, and in part also in "The 'T. C. C.' catalytic cracking process for motor gasoline production" by R. H. Newton, G. S. Dunham and T. P. Simpson, in "Transactions of the American Institute of Chemical Engineers," volume 41, page 215, April 25, 1945, and in articles cited in it.

Reverting now to the disengager 17, the solids-fluid mixture 29 emerging from the exit end 27 of the gas lift 26 continues for a short distance in an upward path into the disengaging zone 28 until it is met by a blast of a gas, not incompatible with the solids or lift gas, directed against it from the nozzle end 31 of the diversion gas blast line 32. The volume-rate and velocity of the gas blast issuing from the nozzle 31 is set, in accordance with the shortest distance of the outlet of nozzle 31 from the issuing stream of the solids-fluid mixture and the concentration, density and average size of the solids in the mixture and their velocity, to deliver to the solids enough momentum in the direction horizontally transverse to their upward momentum to divert them from the directly upward path they would otherwise follow so that they continue upward in a trajectory leading away from nozzle 31, and inclining upwardly only the short distance for their upward momentum to be overcome by the pull of gravity. Then the catalyst granules fall through a relatively short trajectory until they come to repose on top of the catalyst surge bed 16.

With the solids thus removed, by falling downwardly through the relatively low trajectory, from the solids-gas mixture, the mixed lift gas and diversion gas leave the disengaging zone 28 through the gas exit conduit 33.

In the modification of the disengager 17 shown in Figure 2, the left-hand wall 34 of the disengager is built nearer to the line of upward projection from the lift pipe 26 so that as the diversion gas issues from the nozzle end 31a of the diversion gas blast line 32, its effect is more directly and quickly applied to the stream of solids-gas mixture issuing from the exit end 27 of the lift pipe 26 as a result of the extensive foreshortening of the gap between the two streams. An indicated in Fig. 3, nozzle end 31 a has noncircular configuration and is indicative only of the many possible variations in nozzle design which may be employed successfully to direct the stream of gas introduced therethrough to most efficiently exert on the mixed gas-solids stream the desired vectoring force.

In the modification illustrated in Figure 4, the rising half 37 of lift pipe 26, nearer the diversion gas blast line 32, is extended as shown to a level preferably only shortly above the top of blast line 32 and the outlet 31 of the latter is extended further into the disengaging zone 28 so that it opens directly into, and ends at its intersection with, the extended half 37 of lift pipe 26.

The disengager 17 of Figures 1 through 4 is not restricted to the inclusion of merely one gas blast line 32, as used in these figures, for more than one can be used depending on the particular conditions in the operation of the entire cycle. Thus, for example, four gas blast lines 32 are included in the modification of disengager 17 shown in Figure 5 and also in Figure 9, and the outlet 31 of each of the lines 32 ends at its intersection with the extended half 37 of the lift pipe 26. These particular structural features can be used in this and other constructions, made possible by this invention, by determining the conditions as to division and operation of the blasts to be applied through the blast lines 32 to allow only a very shallow rise in the trajectory of the solids-gas mixture 29 inclining away from the outlets 31. (In this modification, as also in that of Figures 7 and 9, the extension 37 of lift 26 can be tangent to wall 34, as shown in Figure 10, by having its middle vertical element substantially, and preferably, in contact with that wall. However, it is advantageous to shorten the distance between walls 34 and 35 by having the cylindrical portion of extension 37 constitute a part of wall 34 and to have the balance of wall 34 run outwardly from the opposing open edges of extension 37 respectively to the other two walls, as shown in Figure 8.)

It is not essential that the diverting gas blasts impinge against the solids-gas mixture 29 perpendicularly to its otherwise normally upward path on emerging from the exit end 27 of gas lift 26. In many of the various possible installations to incorporate the practice of the invention, it is advantageous to direct the diverting blasts at an inclined angle, and at least usually under ninety degrees to the emerging flow direction of the solids-gas mixture. Figure 6 illustrates one such modification, employing in this case merely a single large diverting gas blast line 39, with its center line at an angle of about forty-five degrees to the mixture's emerging direction (or to the projection of wall 34 above the disengager ceiling, as viewed in Figure 6). This angle, for convenience designated the diverting blast line entry angle, can be varied as dictated by the conditions of the specific installation planned and at least usually is effectively beneficial at under ninety degrees, and from present determinations for the most part is especially effective when it is between about thirty and about sixty degrees. In many cases, using an inclined diverting blast line, the distance between the vertical walls 34 and 35 can be less than that in the modifications with the diverting blast lines entering substantially perpendicularly to vertical wall 34.

The modification illustrated in Figures 7 and 8 shows a system wherein an additional auxiliary blast of gas is blown through the auxiliary blast feed line 41 and enters the disengaging zone 28 through the auxiliary blast conduit, and preferably conduits, 42, having a curvature turning away from the exit end 27 of lift 26 as the conduit 42 extends merely a relatively short distance thereabove into disengaging zone 28. The effect of the blast emerging from the thus curved conduit, or conduits, 42 is to create a lower pressure or slight vacuum condition in that location about the exit end 27 of lift 26 whereby the granules or pellets and lifting fluid are moved toward that lower pressure area and thereby out of the way of the emerging stream following them out of the exit end 27 of the lift. The conduit, or conduits, 42 can be concentric with the open half of the exit end 27 of lift 26 or may be semi-elliptical with the shorter diameter of the ellipses tangent at about the lift exit 27 where lift extension 37 joins wall 34. In some instances the desired low pressure condition can be obtained directly by withdrawing a portion of the lift gas through conduits 42 and line 41.

Similar advantages can be obtained by combining with an inclined blast line 39 at least one, and, as illustrated in Figures 9 and 10, for example, four auxiliary blast lines 32 with their streams issuing normal to the direction of emergence of the solids-gas mixture 29 from the exit end 27 of lift 26. The blasts from lines 32, as in the embodiments of Figures 1 through 5 divert the granules or pellets out of line of the path normally otherwise followed by the solids-gas mixture emerging from the lift.

The supplemental fluid, and preferably gas, blasts employed to produce a positive diverting pressure against and across the emerging stream of solids-fluid mixture 29 need not always be directed normally, or perpendicularly, to what would be the undisturbed direction of the emerging stream, but as already noted in relation to Figures 6, 7 and 9, can also be directed at an inclined angle, preferably from above the horizontal. In some operations certain combinations of normal-directed and inclined-directed blasts are advantageous. Likewise these various combinations may include with the normal-directed and/or inclined-directed blasts the upwardly and outwardly directed auxiliary blast introduced through suitable conduits such as conduits 42 illustrated in Figure 7. In the various constructions, the volume, velocity, and direction of the auxiliary and supplemental blasts are determined by the general requirements of the overall operation and the delivery demands on the lift system and whether more than one lift is used, and the dimensions and design of the blast lines are influenced by the momentums and kinetic energy involved and are adjustable by readily set tests.

In this connection, it is to be noted that the energy required to be delivered by the blasts is far below that required to elevate the solid materials because to divert them from the stream issuing from a lift the force of gravity does not have to be overcome. Ordinarily, the rate of change of the direction of the emerging discrete solid materials will be relatively inversely proportional to the momentum of the granules or pellets.

The possibility of the individual granules or pellets falling downward an excessive distance after disengagement from the stream issuing from the lift is even further reduced by interposing a system of staggered baffles 43 and 44 included in the embodiment shown in Figures 9 and 10. The ends of the baffles 43 nearer the emerging stream are set in a flared arrangement, as shown, with the lowest nearer the upward projection of lift 26 and the topmost farthest from it, obviously to allow space for the diverting of the emergent stream. Those granules or pellets which begin to fall earliest will fall only a short distance to, and roll down over, the lowermost baffle 43. Then those that rise higher than any others likewise fall only a short distance to, and roll down over, the topmost baffle 43, to the topmost baffle 44, to the next lower baffle 43, to the next lower baffle 44, and alternately so on down to the surge bed accumulated on the bottom of the disengager. Those particles rising to the intermediate heights similarly will fall only a short distance to, and roll down over, the nearest intermediate baffle 43 and similarly drop alternatively to a baffle 44 and back to a baffle 43, until rolling off of the lowermost baffle 43 to the surge bed.

The method of this invention is especially advantageously applicable to the disengagement from an emerging lift stream of granules and pellets of at least about sixty mesh size and larger, and usually of the order of about fourteen mesh and somewhat larger, or putting it in specific dimensions, of at least about one millimeter and larger, and at least usually between about two and five millimeters, and somewhat over, in diameter or cross thickness. These solid materials that can be handled may be coarse and irregular granules, or of uniform structure such as molded pellets or beads as are commonly employed for hydrocarbon conversion catalysts, for example, the standard commercially available alumina-silica cracking catalyst used in non-turbulent beds.

Any suitable conveying or lifting fluid can be used, especially gases, such as dry gas, as air or the flue gases from the cracking system regenerator, and the like, or wet gases such as those indicated but having some content of vapors, or entirely vapors, which the term gaseous fluid includes, such as steam, or petroleum, or petroleum fraction, or cracking product, vapors, or others, depending on the system in which the process of the invention is employed.

While the invention has been described in relation to certain specific embodiments, it is to be understood that many and various modifications and substitutions can be made within the scope of the appended claims which likewise embrace equivalents that can be developed.

What is claimed is:

1. A disengager for separating conveyed granular solids from an upwardly directed stream of lift gas discharging from the upper end of a lift pipe comprising a vessel containing the upper end portion of said lift pipe and extending a substantial distance above said upper end, gas outlet means at the upper end of said vessel, solids outlet means at the lower end of said vessel, and means for introducing deflecting gas into said vessel in such amount and so directed as to intersect the discharging stream of lift gas and solids and to deflect said solids toward a side of said vessel, said means for introducing deflecting gas into said vessel including means for discharging gas as a horizontally directed stream.

2. Apparatus as defined in claim 1 in which said means for introducing deflecting gas comprises means for discharging gas upwardly and outwardly adjacent to the upper perimeter of said lift pipe.

3. Apparatus as defined in claim 1 including means at one side of said vessel for intercepting falling deflected solids at a plurality of levels, said intercepting means being arranged to pass the intercepted solids by gravity flow between levels to the bottom of said vessel.

4. Apparatus as defined in claim 1 in which an arcuate portion of said lift pipe is extended upwardly to the top of said vessel, and said deflecting gas is introduced laterally through the wall of said arcuate portion.

References Cited in the file of this patent

UNITED STATES PATENTS

| 1,391,744 | Lower | Sept. 27, 1921 |
| 1,597,438 | Ennis | Aug. 24, 1926 |
| 2,106,869 | Falkenstein | Feb. 1, 1938 |
| 2,358,497 | Egloff | Sept. 19, 1944 |

FOREIGN PATENTS

| 278,858 | Germany | July 18, 1913 |
| 360,968 | Germany | Oct. 9, 1922 |